United States Patent [19]

Meisser et al.

[11] 4,325,262
[45] Apr. 20, 1982

[54] APPARATUS FOR MEASURING LIQUID FLOW

[75] Inventors: Claudio Meisser, Allenwinden; Hans Strasser, Baar; Hubert Lechner, Cham, all of Switzerland

[73] Assignee: LGZ Landis & Gyr Zug AG, Zug, Switzerland

[21] Appl. No.: 156,334

[22] Filed: Jun. 4, 1980

[30] Foreign Application Priority Data

Jun. 8, 1979 [CH] Switzerland .................... 5343/79

[51] Int. Cl.³ ............................................. G01F 1/66
[52] U.S. Cl. .................................................. 73/861.28
[58] Field of Search ........... 73/861.18, 861.27, 861.28, 73/861.29

[56] References Cited

U.S. PATENT DOCUMENTS

| 3,817,098 | 6/1974 | Brown | 73/861.28 |
| 3,964,309 | 6/1976 | Husse et al. | 73/861.28 |
| 4,140,012 | 2/1979 | Hendriks | 73/273 |
| 4,144,752 | 3/1979 | Lolk | 73/861.28 |

Primary Examiner—Herbert Goldstein

Attorney, Agent, or Firm—Ernest F. Marmorek

[57] ABSTRACT

An apparatus for ultrasonically determining fluid flow passing through a measurement section includes a tube which has two ends and an average predetermined inner cross-sectional area; the tube constitutes the measurement section. A sound-emitting transducer is disposed near one end of the tube, which has a first sound-transfer surface, and a sound-receiving transducer disposed near the other end of the tube, which has a second sound transfer surface. Each sound transfer surface is disposed at a sufficiently large predetermined distance from a corresponding end of the tube, so as to permit the fluid flowing through the tube. A fluid-receiving chamber communicates with the one end of the tube, and has a first average cross-sectional area, and a fluid-discharge chamber communicates with the other end of the tube, and has a second average cross-sectional area. The tube extends through the chambers, and each of the first and second cross-sectional areas exceeds the inner cross-sectional area by a factor of at least two. At least one of the chambers surrounds a corresponding end of the tube along at least a portion of the tube exceeding the average inner width thereof.

16 Claims, 6 Drawing Figures

APPARATUS FOR MEASURING LIQUID FLOW

SUMMARY OF THE INVENTION

One of the principal objects of the present invention is to devise an apparatus for ultrasonically determining fluid flow passing through a measurement section, which may be installed between two tube ends spaced apart by a relatively short distance, but nevertheless has the required length to obtain the desired accuracy of measurement. Additionally it is required that the apparatus has as small a resistance as possible to flow, and can be manufactured easily.

This object is achieved by the apparatus for ultrasonically determining fluid flow passing through a measurement section, including a tube which has two ends and an average predetermined inner cross-sectional area constituting the measurement section, a sound-emitting transducer disposed near one end of the tube, which has a first sound-transfer surface, and a sound-receiving transducer disposed near the other end of the tube, which has a second sound transfer surface. Each sound transfer surface is disposed at a sufficiently large predetermined distance from a corresponding end of the tube, so as to permit the fluid flowing through the tube. A fluid-receiving chamber communicates with the one end of the tube, and has a first average cross-sectional area, and fluid-discharge chamber communicates with the other end of the tube, and has a second average cross-sectional area. The tube extends through the chamber, and each of the first and second cross-sectional areas exceeds the inner cross-sectional area by a factor of at least two. At least one of the chambers surrounds a corresponding end of the tube along at least a portion of the tube exceeding the average inner width thereof.

Further objects and advantages of the invention will be set forth in part in the following specification, and in part will be obvious therefrom, without being specifically referred to, the same being realized and attained as pointed out in the claims hereof.

BRIEF DESCRIPTION OF THE DRAWING

For a fuller understanding of the nature and objects of the invention, reference should be had to the following detailed description, taken in connection with the accompanying drawings, in which.

DESCRIPTION OF THE PREFERRED EMBODIMENTS

Figure 1:
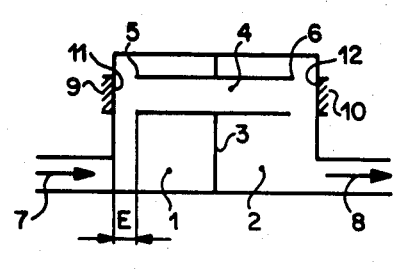
FIG. 1 is a schematic block diagram of a first embodiment of the apparatus, according to the present invention.

Referring now to the drawings, where equivalent parts have been provided with identical reference numerals, it will be seen from FIG. 1 that two relatively large and box-shaped hollow bodies form chambers 1 and 2 separated from one another by an end wall 3. A tube 4 has two ends and an average predetermined inner cross-sectional area; the tube constitutes the measurement section. A sound-emitting transducer 9 is disposed near one end of the tube 4 and has a first sound-transfer surface, and a sound-receiving transducer 10 is disposed near the other end of the tube 4 and has a second sound transfer surface. Each sound transfer surface is disposed at a sufficiently large predetermined distance E from a corresponding end of the tube 4 so as to permit fluid flowing through the tube. The fluid-receiving chamber 1 communicates with one end of the tube 4, and has a first average cross-sectional area, and the fluid-discharge chamber 2 communicates with the other end of the tube 4 and has a second average cross-sectional area. The tube 4 extends through the chambers 1 and 2, and each of the first and second cross-sectional areas exceeds the inner cross-sectional area of the tube 4 by a factor of at least two. Each chamber 1 or 2 surrounds a corresponding end of the tube 4 along at least a portion of the tube which exceeds the average inner width or diameter thereof. Each chamber 1 and 2 includes fluid-connecting means, for example an inlet connection 7, and a discharge connection 8. The flow of the fluid is denoted by arrows in the figures. The fluid-connecting means 7 and 8 are spaced at respective prearranged distances from corresponding ends of the tube 4. Each fluid-connecting means 7 and 8 has a center, and the centers define a center line. The fluid flow to be measured passes from the inlet 7 to the fluid-receiving chamber, 1 passes into the tube 4 through an end 5 thereof, is discharged therefrom through another end 6, and passes through the fluid-discharge chamber 2, wherefrom it is discharged through the discharge-end 8. Each sound transfer surface 11 and 12 has a center, and a plumb line is defined by a line perpendicular to a measurement axis passing through the centers of the transfer surfaces 11 and 12. While each distance E has been chosen to permit as large as volume of fluid passing through the tube near the ends 5 and 6, respectively, the greatest accuracy in measurement is obtained if the distance E are made as small as possible. An optimal solution is obtained when the average predetermined inner cross-sectional area of the tube 4 has an average width equal to about twice the predetermined distance E.

Figure 2:
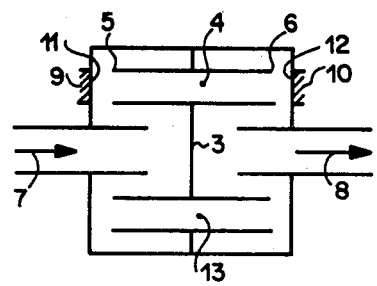
FIG. 2 is a second schematic block diagram of a second embodiment of the apparatus, according to the present invention.

The embodiment shown in FIG. 2 includes one additional tube 13 similar to the tube 4, which communicates with the chambers 1 and 2; the additional tube 13 is spaced from the sound transfer surfaces 11 and 12 at spacings similar to the predetermined distance E from corresponding ends of the tube 4 to the sound transfer surfaces 11 and 12, respectively. Also the tube 13 is spaced from each fluid connecting means 7 and 8 at spacings similar to the prearranged distances separating corresponding ends of the tube 4 from respective fluid-connecting means 7 and 8. This arrangement permits an increased measurement range by dividing the total flow of fluid into two partial streams. By disposing the tubes 4 and 3 symmetrically within the chambers 1 and 2, a measurement arrangement independent of the total flow of liquid passing through the tubes is obtained. It is also possible to realize more than two partial streams.

Figure 3:
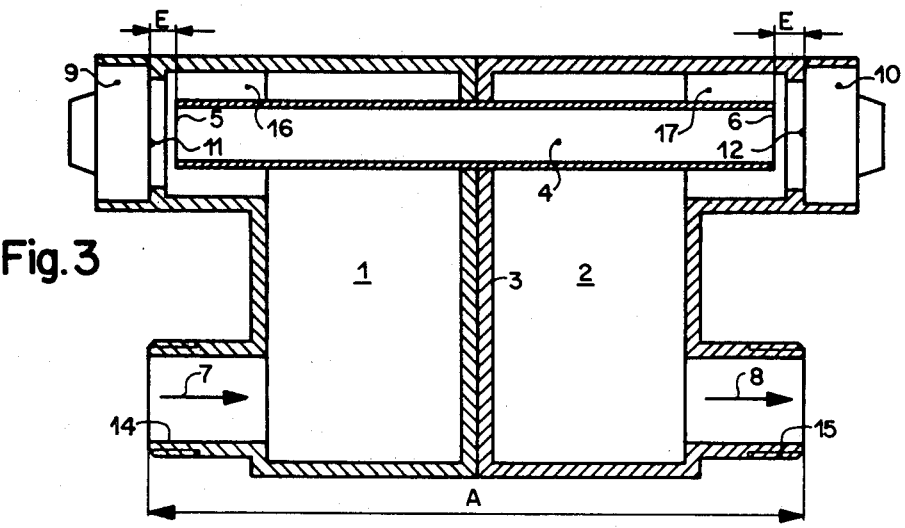
FIG. 3 is an elevational view in part cross-section of the first embodiment of the invention.

The embodiment shown in FIG. 3 provides for each chamber 1 and 2 to be a box-shaped hollow body, and wherein the end walls 3 are rigidly connected to one another to form a common wall, and the tube 4 passes through the common wall. Connecting nipples 14 and 15 disposed respectively on the lower ends of the chambers 1 and 2 shown in FIG. 3 serve as inlet receiving means 7 or discharge means 8 for the fluid. The distance A separating the outer ends of both connecting nipples 14 and 15 is 190 mm in the example shown, and corresponds to a normal separation distance for the installation of fluid counters.

The tube 4 in FIG. 3 is disposed near the upper border to the chambers 1 and 2. It passes through the separating walls 3 forming a seal therewith. A space is formed between the connecting nipples 14 and 15 and the tube 4, respectively, which the fluid traverses. The use of large chambers permits the cross-sectional areas of the chamber to be selected, so that each is a multiple of the average inner width of the tube 4. The velocity of fluid in the chambers 1 and 2 is therefore made small, which prevents the formation of turbulence, and hence loss of pressure and cavitation, and assures a uniform inlet or discharge of the fluid over the whole area of each end of the tube 4.

So as to increase the measurement accuracy at a given separation distance A of the connecting nipples, it is advantageous to lengthen the distribution chambers in FIG. 3 in the end regions 5 and 6 of the tube 4, so that each chamber 1 and 2 surrounds a corresponding end of the tube 4, along at least a portion of the tube 4 exceeding the average inner width thereof. Each chamber forms with the tube 4 respective channels 16 and 17 concentric with the center axis of the tube, so that the fluid is allowed to flow through the respective channels 16 and 17 in a direction opposite to the flow of the fluid in the tube 4 from the end 5 to the end 6; the fluid thus flows in the channel section 16 towards the end 5, and in the channel section 17 towards the end 6 of the tube 4.

Figure 4:
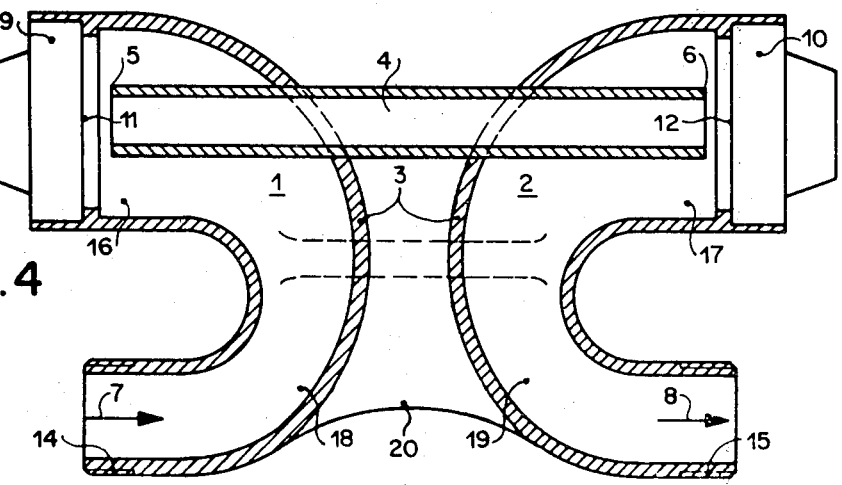
FIG. 4 is an elevational view in part cross-section of a third embodiment of the present invention.

In the embodiment shown in FIG. 4 each chamber 1 and 2 consists of respective arcuate pipes bent through an angle of about 180°, and has an inner cross-section which continuously widens in a direction away from corresponding fluid-connecting means, such as nipples 14 and 15 respectively, and communicates with corresponding channels 16 and 17. The transducers 9 and 10 are disposed near ends of the pipes 1 and 2 remote from the respective nipples 14 and 15; holding means, such as a rib 20, connect the pipes 1 and 2 to one another.

In the embodiments described hitherto the measuring section is constituted by a tube 4, which has a straight center axis, and which is parallel with the center line defined by the centers of the fluid-connecting means, such as the nipples 14 and 15. This is an advantageous arrangement for manufacturing the chambers or pipes, so that the housing formed by the chambers 1 and 2 may be cast, or pressed either in one or two pieces, screwed to one another or also braised to one another. The tube 4 preferably consists of extrudable material. The tube 4 may be cast, pressed, braised or sealed in any other suitable manner.

When the tube 4 is cast, it is advantageous to process its inner surface so as to reduce resistance to flow.

Figure 5:
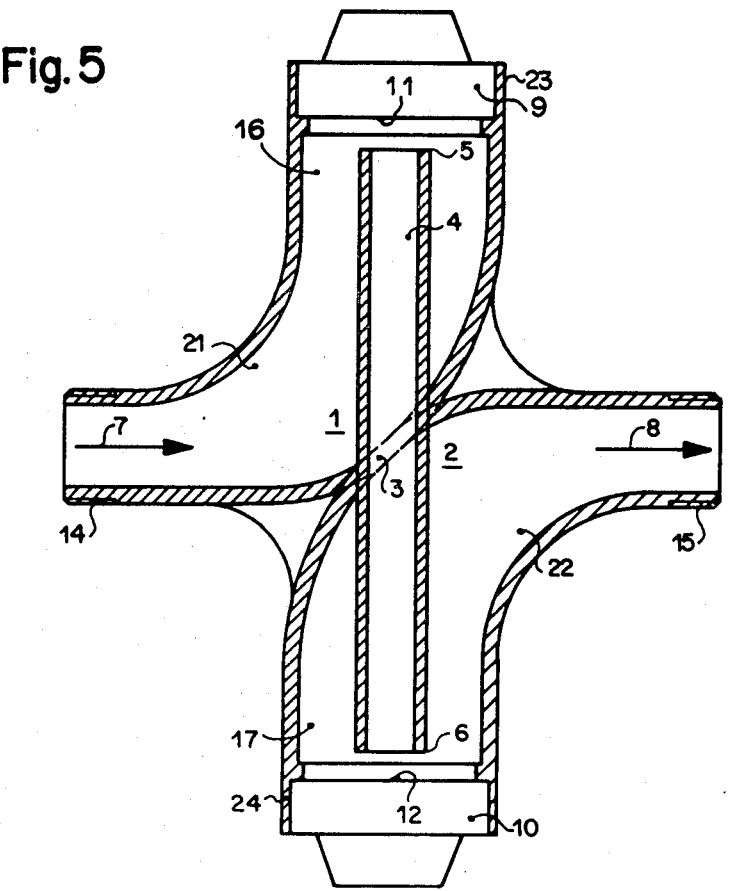
FIG. 5 is an elevational view in part cross-section of a fourth embodiment of the present invention.

So as to reduce losses of fluid flow due to rerouting of the fluid stream, arrangements are also possible, where the center axis of the tube 4 is straight, for it to form an arbitrary predetermined angle with the center line defined between the centers of the nipples 14 and 15. In the embodiment shown in FIG. 5 the center line between the centers of the nipples 14 and 15, and the axis of the tube 14 cross one another and are disposed perpendicular to one another.

This is attached by the chambers being formed in the shape of arcuate pipes bent through respective angles of about 90°, and by each having an inner cross-section which is continuously widening in a direction away from a corresponding nipple 14 and 15. The transducers 9 and 10 are disposed near ends of the pipes 1 and 2 remote from the respective nipples 14 and 15.

By suitably shaping the pipes 18 and 19 serving as distribution chambers 1 and 2 shown in FIG. 4, other embodiments permitting a favorable fluid stream are possible; for example the inlet 7 shown in FIG. 4 at the bottom left corner could lead to the end 6 of the tube 4 shown at the top right of the FIG. 4, while the fluid discharged from the end 5 could lead to the discharge end 8.

In this case, the pipes 18 and 19 shown in FIG. 4 need not be bent by 180°, but the pipes must be narrowed in a direction at right angles to the plane of the paper, and the axis of the tube 4 must be slightly pivoted in a plane at right angles to the plane of the paper.

Figure 6:
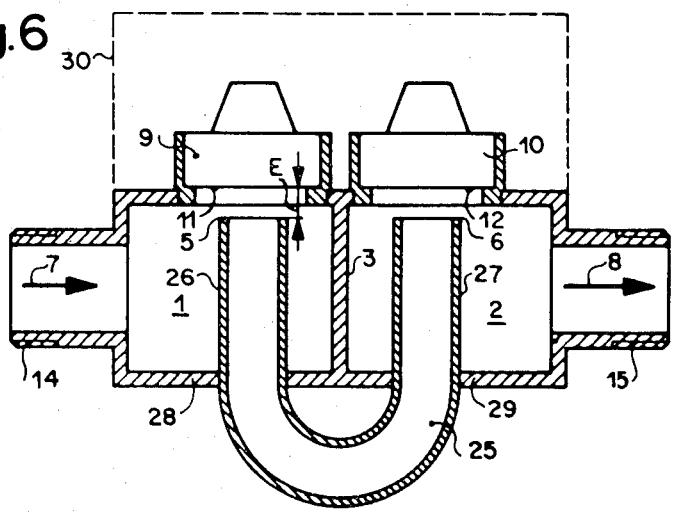
FIG. 6 is an elevational view in part cross-section of a fifth embodiment of the present invention.

In the embodiment shown in FIG. 6 the tube 25 is U-shaped, each chamber 1 and 2 has respective sidewalls 28 and 29, and includes sidewalls 31 and 32 disposed opposite the sidewalls 28 and 29, respectively. The transfer surfaces 11 and 12 of transducers 9 and 10 are disposed near the sidewalls 31 and 32 respectively, and, the ends 5 and 6 of the tube 4 extend through the sidewalls 28 and 29 respectively. It will be noted that the transfer surfaces 11 and 12 are spaced from the ends 5 and 6 of the tube 4 by the previously noted distance E. Due to the size of the chambers 1 and 2 the free flow of the fluid to the end 5 of the tube 4 and discharge from the end 6 of the tube 4 is ensured along the entire cross-section of the legs 26 and 27 of the U-shaped tube 4. An arrangement of this type has the advantage that the two transducers are spaced close to one another, and may be surrounded by, and disposed within a common housing 30, which is shown dotted in FIG. 6. The transducers 9 and 10 are adapted to be functionally connected to electronic measurement means for measuring the velocity of sound through the fluid flowing through the tube 25, wherein the measured sound velocity is a function of the fluid flow. The electronic measurement means are advantageously disposed within the housing 30. This arrangement dispenses with accessible supply leads to the transducers 9 and 10, so that any possibility for fraudulent tampering with the apparatus according to the present invention is correspondingly reduced. The transducers described are particularly suitable for a fluid heat counter, where it is possible in addition to measuring the quantity of fluid passing through the apparatus also to measure any temperature differences between the fluid flowing to a user, and the fluid discharged therefrom.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. An apparatus for ultrasonically determining fluid flow passing through a measurement section, comprising in combination:

a tube having two ends, and an average predetermined inner cross-sectional area, constituting said measurement section, a sound-emitting transducer disposed near one end of said tube, having a first sound-transfer surface, a sound-receiving transducer disposed near the other end of said tube, having a second sound transfer surface, each sound transfer surface being disposed at a sufficiently large predetermined distance from a corresponding end of said tube so as to permit said fluid flowing through said tube, a fluid-receiving chamber communicating with said one end of said tube, having a first average cross-sectional area, and a fluid-discharge chamber communicating with the other end of said tube, having a second average cross-sectional area, said tube extending through said chambers, each of said first and second cross-sectional areas exceeding the inner cross-sectional area by a factor of at least two, at least one of said chambers surrounding a corresponding end of said tube along at least a longitudinal portion of said tube exceeding the average inner width thereof.

2. An apparatus as claimed in claim 1 wherein each chamber includes fluid-connecting means spaced at respective prearranged distances from corresponding ends of said tube.

3. An apparatus as claimed in claim 1, wherein each chamber has an end wall, said end walls facing each other, and said tube extending through said end walls.

4. An apparatus as claimed in claim 1, wherein each sound transfer surface has a center, said center being operatively positioned so that a plumb line is substantially perpendicular to a measurement axis passing through said centers.

5. An apparatus as claimed in claim 1, wherein said average predetermined inner cross-sectional area has an average width equal to about twice said predetermined distance.

6. An apparatus as claimed in claim 3, wherein each chamber is a box-shaped hollow body, and wherein said end walls form a common wall, and said tube passes through said common wall.

7. An apparatus as claimed in claim 2, wherein said tube is a first tube, and further comprising at least one additional tube similar to said first tube communicating with said chambers, each additional tube being spaced from each sound transfer surface and from each fluid-connecting means at spacings similar to respective of said distances.

8. An apparatus as claimed in claim 7, wherein said tubes are symmetrically disposed within said chambers.

9. An apparatus as claimed in claim 1, wherein a center axis is defined in said tube, the fluid flowing in a predetermined direction through said tube, and wherein each chamber surrounds a corresponding end of said tube along at least a portion of said tube exceeding the average inner width thereof, and forms therewith a channel concentric with said center axis, whereby the fluid is allowed to flow through respective of said channels in a direction opposite to said predetermined direction.

10. An apparatus as claimed in claim 9, wherein each chamber includes fluid-connecting means spaced at respective preallotted distances from corresponding ends of said tube, and wherein each chamber comprises an arcuate pipe bent through an angle of about 180°, having an inner cross-section widening in a direction away from a corresponding of said fluid-connecting means, and communicating with a corresponding channel, said transducers being disposed near ends of said pipes remote from respective of said fluid-connecting means, and further comprising holding means connecting said pipes to one another.

11. An apparatus as claimed in claim 2, wherein each fluid-connecting means has a center, said centers defining a center-line, and wherein said tube has a straight center axis, forming a predetermined angle with said center-line.

12. An apparatus as claimed in claim 11, wherein said predetermined angle is about zero degrees.

13. An apparatus as claimed in claim 11, wherein said predetermined angle is about ninety degrees.

14. An apparatus as claimed in claim 1, wherein each chamber includes fluid-connecting means spaced at respective preallotted distances from corresponding ends of said tube, each having a center, said centers defining a center line, and wherein each chamber comprises an arcuate pipe bent through an angle of about 90°, having an inner cross-section widening in a direction away from a corresponding fluid-connecting means, said transducers being disposed near ends of said pipes remote from respective of said fluid-connecting means, and wherein said tube has a straight center axis approximately perpendicular to said center line.

15. An apparatus as claimed in claim 1, wherein said tube is U-shaped, each chamber has a first sidewall, and a second sidewall opposite said first sidewall, said transducers being disposed near said second sidewalls, respectively, the ends of said tube extending through said first sidewalls, and facing said transducers, respectively.

16. An apparatus as claimed in claim 1, wherein said transducers are adapted to be functionally connected to measurement means for measuring the velocity of sound through the fluid flowing through said tube, the measured sound velocity being a function of said fluid flow.

* * * * *